(12) United States Patent
Wu

(10) Patent No.: US 9,113,600 B2
(45) Date of Patent: Aug. 25, 2015

(54) ENVIRONMENT-FRIENDLY WATER-SAVING PLANT POT STRUCTURE

(71) Applicant: Chung-Fen Wu, Changhua (TW)

(72) Inventor: Chung-Fen Wu, Changhua (TW)

( * ) Notice: Subject to any disclaimer, the term of this patent is extended or adjusted under 35 U.S.C. 154(b) by 236 days.

(21) Appl. No.: 13/684,455

(22) Filed: Nov. 23, 2012

(65) Prior Publication Data
US 2013/0133255 A1    May 30, 2013

(30) Foreign Application Priority Data
Nov. 24, 2011    (TW) .............................. 100222276 U

(51) Int. Cl.
*A01G 27/02* (2006.01)
*A01G 9/02* (2006.01)

(52) U.S. Cl.
CPC . *A01G 9/02* (2013.01); *A01G 27/02* (2013.01)

(58) Field of Classification Search
CPC ....... A01G 27/00; A01G 27/02; A01G 27/04; A01G 27/06
USPC .............................. 47/66.1, 75, 79, 80, 81, 82
See application file for complete search history.

(56) References Cited

U.S. PATENT DOCUMENTS

| | | | | |
|---|---|---|---|---|
| 1,557,712 A * | 10/1925 | Little | ............................. | 47/65.6 |
| 2,238,132 A * | 4/1941 | Ritter | ................................ | 47/80 |
| 4,735,016 A * | 4/1988 | Hougard | .......................... | 47/80 |
| 5,058,319 A * | 10/1991 | Liao | ................................ | 47/81 |
| 5,535,542 A * | 7/1996 | Gardner et al. | .................... | 47/18 |
| 6,276,090 B1 * | 8/2001 | Lai | .................................... | 47/79 |
| 6,363,658 B1 * | 4/2002 | Lai | .................................... | 47/79 |
| 6,505,440 B1 * | 1/2003 | Lai | .................................... | 47/79 |
| 6,672,007 B1 * | 1/2004 | Lai | .................................... | 47/79 |
| 2007/0214718 A1 * | 9/2007 | Park | ................................. | 47/79 |

* cited by examiner

*Primary Examiner* — Monica Williams
(74) *Attorney, Agent, or Firm* — Che-Yang Chen; Law Office of Michael Chen

(57) ABSTRACT

An environment-friendly water-saving plant pot includes a first pot body and a second pot body. The first pot body has a receiving space having an upward opening, and a water outlet hole formed in the receiving space. A protruding unit that has several reinforced ribs extends upwards from the periphery of the water outlet hole. The second pot body is disposed in the receiving space of the first pot body, and has a second receiving space having an upward opening. A plurality of through holes are circularly formed inside the second receiving space, and the second pot body extends from the bottom to form a cover that has a cover opening, and the opening of the cover opening and the protruding unit of the first pot body are spaced to form a gap.

8 Claims, 17 Drawing Sheets

ENVIRONMENT-FRIENDLY WATER-SAVING PLANT POT STRUCTURE

FIELD OF THE INVENTION

The present invention relates to a environmental-friendly water-saving plant pot structure, and more particularly to a structure using the principle of water evaporation to enable the water vapor in a receiving space of a first pot body to move up to wet the soil and automatically provide necessary amount of water to the plants, so that the water stored in the first pot body can repeat the process of evaporation and condensation to achieve the goal of automatically providing water to the plants for a long period of time, and the soil of the plant can maintain wet to increase the contact area of the soil and vapor to achieve the goal of wetting the soil.

BACKGROUND OF THE INVENTION

Planting different kinds of plants has advantages of developing characters and greening the environment. However, nowadays people are too busy at work and do not have time to take care of the plants by watering them, which may lead the plants to wither due to lack of water. Therefore, a new and improved pot structure that is able to automatically provide water to the plants to keep the soil of the plants wet for a long period of time is needed, so that the user does not have to always pay attention to the amount of water in the soil, and further the user does not have to worry about the plants being withered due to lack of water.

SUMMARY OF THE INVENTION

Plants have to be watered frequently to maintain the amount of water in the soil thereof, so it is difficult to take care of. Therefore, a new and improved pot structure that is able to automatically provide water to the plants to keep the soil of the plants wet for a long period of time is needed, so that the user does not have to always pay attention to the amount of water in the soil, and further the user does not have to worry about the plants being withered due to lack of water.

The present invention provides an environment-friendly water-saving plant pot including a first pot body with a receiving space having an upward opening, and a water outlet hole formed in the receiving space. A protruding unit that has several reinforced ribs extends upwards from the periphery of the water outlet hole. A second pot body is disposed in the receiving space of the first pot body, and has a second receiving space having an upward opening. A plurality of through holes are circularly formed inside the second receiving space, and the second pot body extends from the bottom to form a cover that has a cover opening, and the opening of the cover opening and the protruding unit of the first pot body are spaced to form a gap.

Comparing with the conventional arts, the present invention is advantageous because when there is sunlight or the room temperature increases, the water stored in the receiving space of the first pot body evaporates to become water vapor that goes to the root portion of the plant, and further travels to the second receiving space of the second pot body through the through holes thereof. When the water vapor encounters soil with lower temperature, it condenses to become liquid to wet the soil and automatically provides water to the plants, so that the water stored in the first pot body can repeatedly evaporate and condense in a cycle to achieve the goal of automatically providing water to the plants. Furthermore, the soil of the plants can remain wet for a long period of time to prevent the plants from being withered due to lack of water.

DETAILED DESCRIPTION OF THE INVENTION

The detailed description set forth below is intended as a description of the presently exemplary device provided in accordance with aspects of the present invention and is not intended to represent the only forms in which the present invention may be prepared or utilized. It is to be understood, rather, that the same or equivalent functions and components may be accomplished by different embodiments that are also intended to be encompassed within the spirit and scope of the invention.

Unless defined otherwise, all technical and scientific terms used herein have the same meaning as commonly understood to one of ordinary skill in the art to which this invention belongs. Although any methods, devices and materials similar or equivalent to those described can be used in the practice or testing of the invention, the exemplary methods, devices and materials are now described.

All publications mentioned are incorporated by reference for the purpose of describing and disclosing, for example, the designs and methodologies that are described in the publications that might be used in connection with the presently described invention. The publications listed or discussed above, below and throughout the text are provided solely for their disclosure prior to the filing date of the present application. Nothing herein is to be construed as an admission that the inventors are not entitled to antedate such disclosure by virtue of prior invention.

Figure 1:
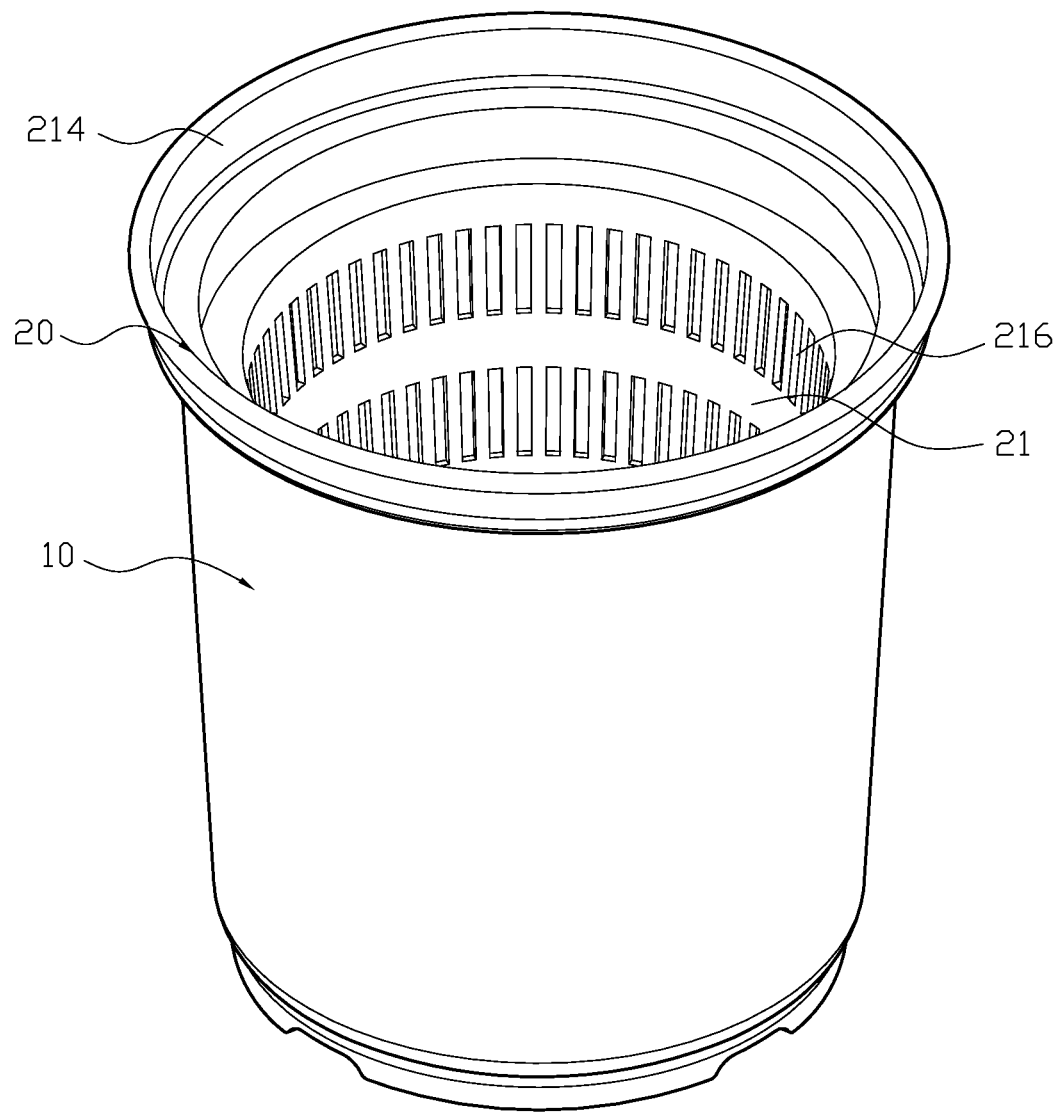
FIG. 1 illustrates a three-dimensional assembled view in the present invention.
Figure 2:
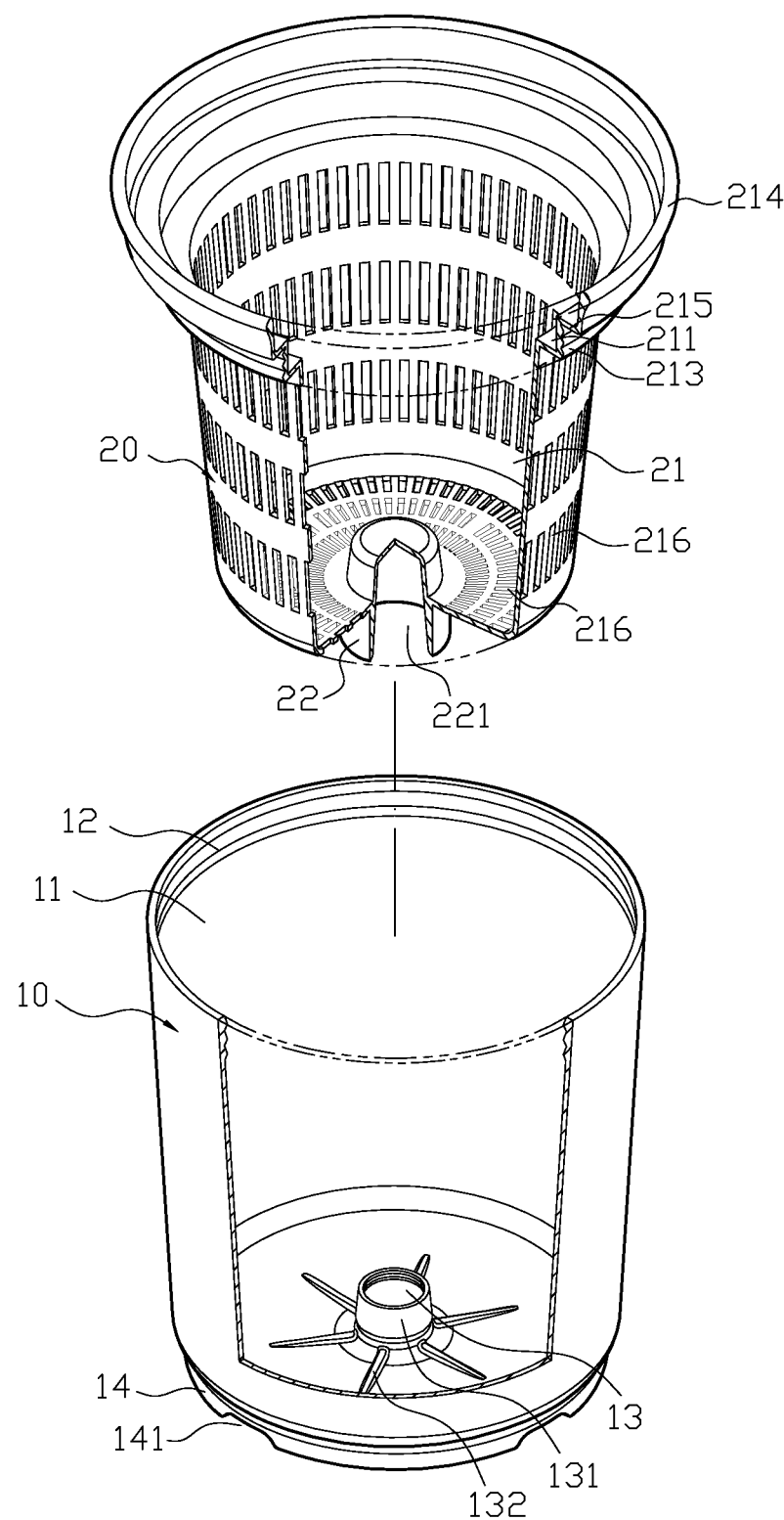
FIG. 2 illustrates an exploded view of the present invention.
Figure 3:
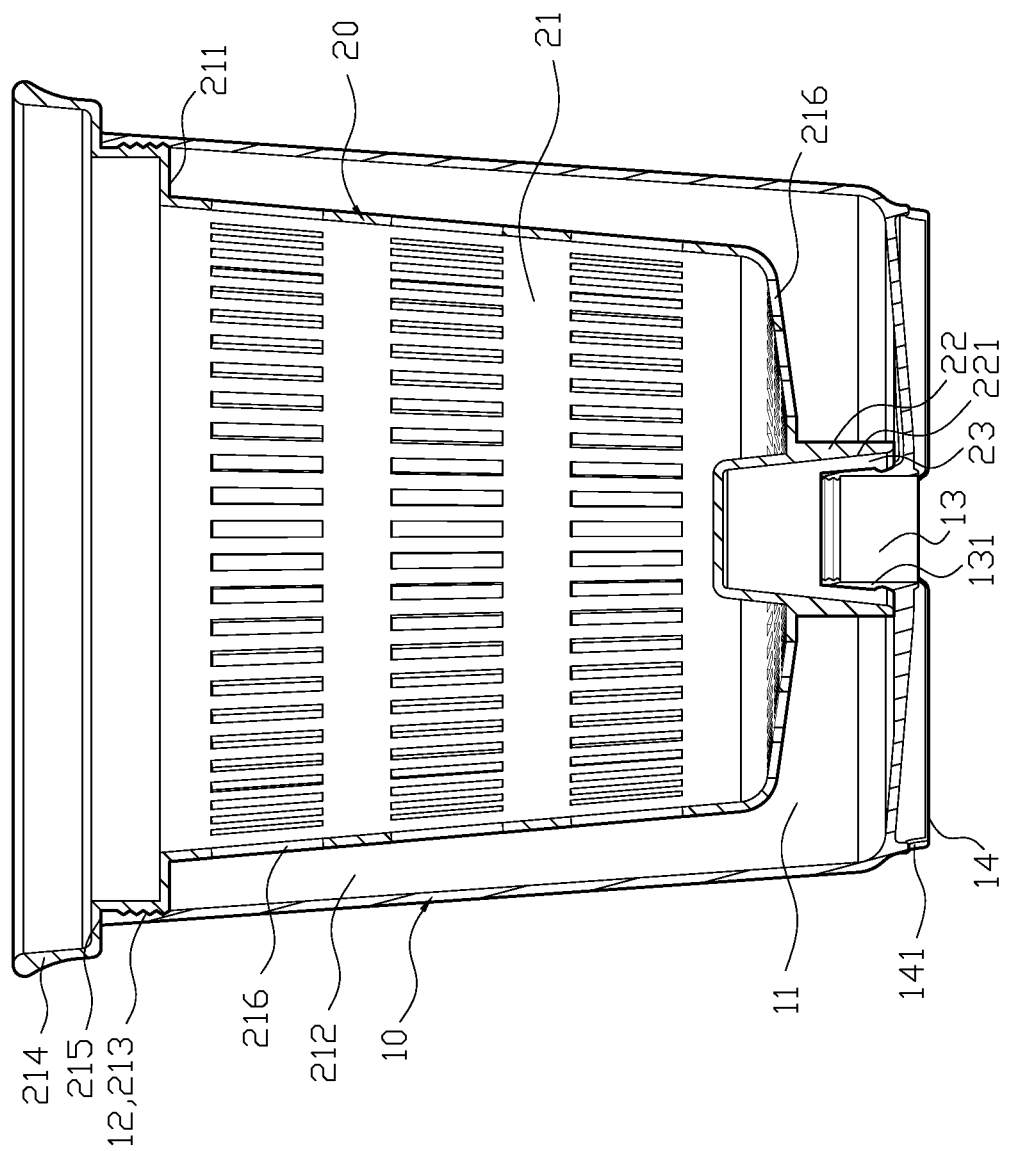
FIG. 3 illustrates a sectional schematic view of the present invention.

In order to further understand the goal, characteristics and effect of the present invention, a number of embodiments along with the drawings are illustrated as following:

Referring to FIGS. 1, 2 and 3, an environment-friendly water-saving plant pot may include a first pot body (10) and a second pot body (20), wherein the first pot body (10) can be made by metal, plastic or ceramic having different coefficients of specific heat. The absorption of radiation can also be changed by changing the color of the pot to further adjust the evaporation speed of the inner moisture. The first pot body (10) has a receiving space (11) having an upward opening, and the edge of the receiving space (11) can be transparent so that the user can observe the water level inside the receiving space (11). A connecting section (12) that has inner threads is formed at the opening of the receiving space (11), and a water outlet hole (13) is formed in the receiving space (11). A protruding unit (131) that has several reinforced ribs (132) extends upwards from the periphery of the water outlet hole (13). A supporting edge (14) extends at the bottom of the pot, and a plurality of notches (141) are spacedly disposed on the supporting edge (14) to drain water from the receiving space (11). The second pot body (20) is disposed in the receiving space (11) of the first pot body (10), and has a second receiving space (21) having an upward opening. An opening of the second receiving space (21) has a spacing unit (211), so that the second receiving space (21) of the second pot body (20) and the receiving space (11) of the first pot body (10) are spaced to form an interlayer (212). The spacing unit (211) also forms a connecting segment (213) with outer threads at outer periphery thereof, and the connecting segment (213) engages with the connecting section (12) of the first pot body (10). The connecting segment (213) further extends to form a pot edge (214) and a stopping surface (215) is formed between the connecting segment (213) and the pot edge (214), and the stopping surface (215) is disposed against the opening of the first pot body (10). A plurality of through holes (216) are circularly formed inside the second receiving space (21), and the second pot body (20) extends from the bottom to form a cover (22) that has a cap opening (221), and the opening of the cap opening (221) and the protruding unit (131) of the first pot body (10) are spaced to form a gap (23).

Figure 6:
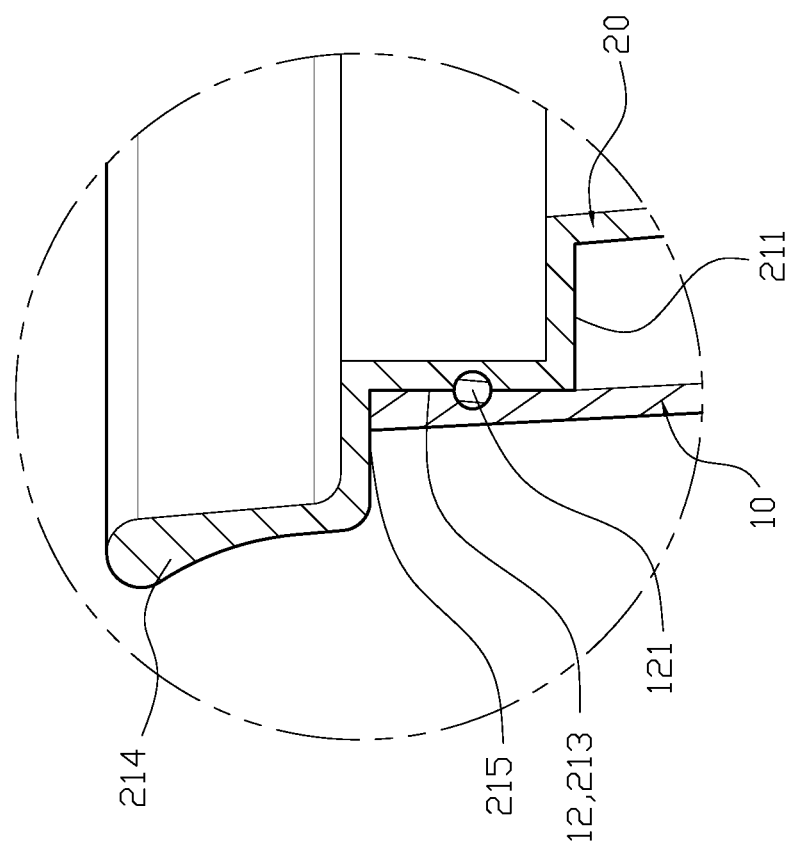
FIG. 6 illustrates a partial sectional view of the second embodiment in the present invention.
Figure 7:
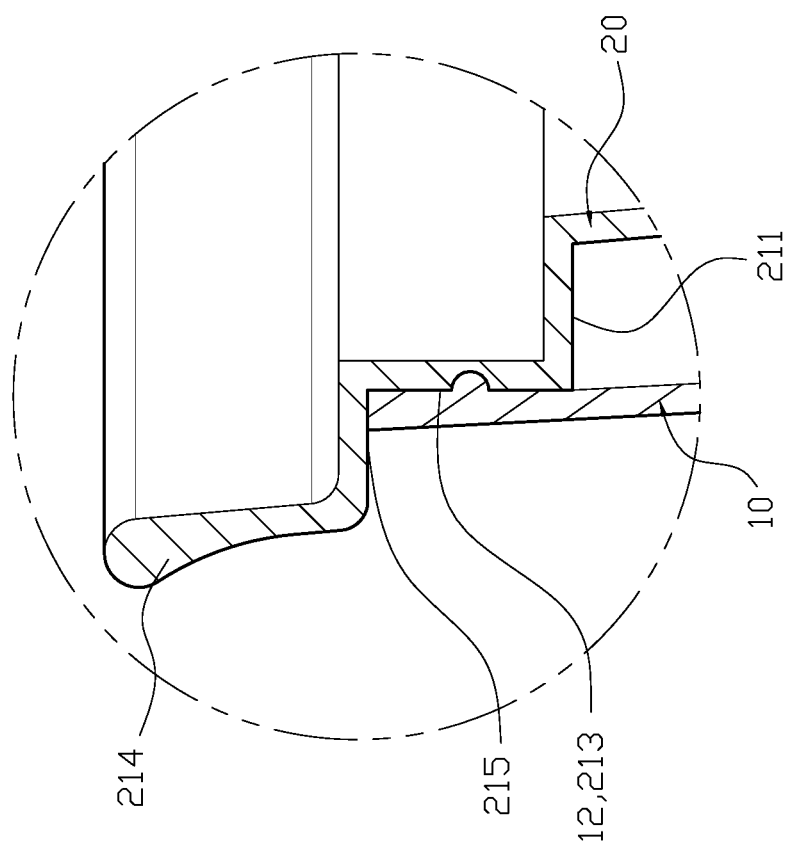
FIG. 7 illustrates a partial sectional view of the third embodiment in the present invention.
Figure 13:
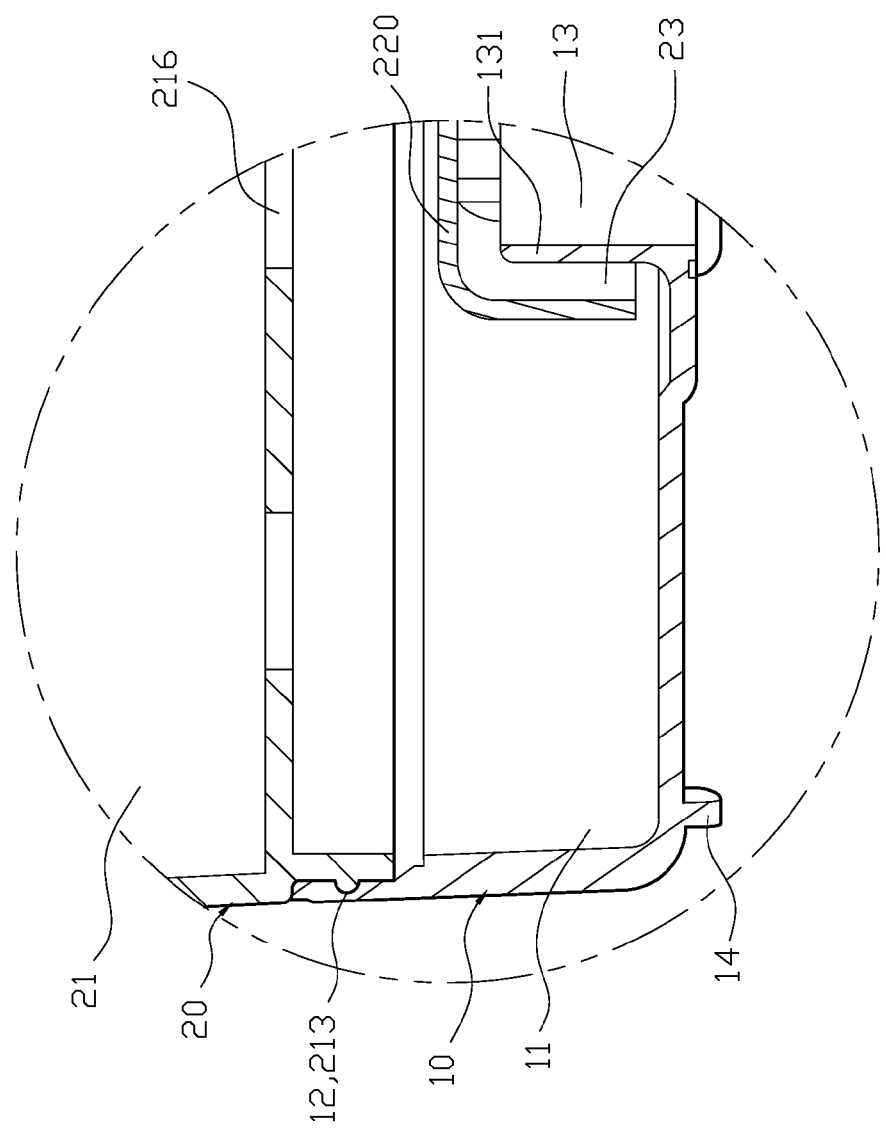
FIG. 13 illustrates another sectional view of the sixth embodiment in the present invention.

Referring to FIGS. 2 and 3 for the structure of the present invention, the second pot body (20) is disposed in the receiving space (11) of the first pot body (10), and the connecting segment (213) of the second pot body (20) engages with the connecting section (12) of the first pot body (10), so that the stopping surface (215) of the second pot body (20) is disposed against the opening of the first pot body (10) to complete the assembly process. In one embodiment, the connecting segment (213) of the second pot body (20) and the connecting unit (12) of the first pot body (10) are engaged by screws. In another embodiment, the second pot body (20) is disposed at the opening of the first pot body (10), and a gasket (121) is disposed between the connecting segment (213) and the connecting unit (12) (See FIG. 6) to enhance the sealing performance between the first and second pot body. In a further embodiment, the connecting unit (12) of the first pot body (10) and the connecting segment (213) of the second pot body (20) are wedged to connect to each other (See FIGS. 7 and 13).

Figure 4:
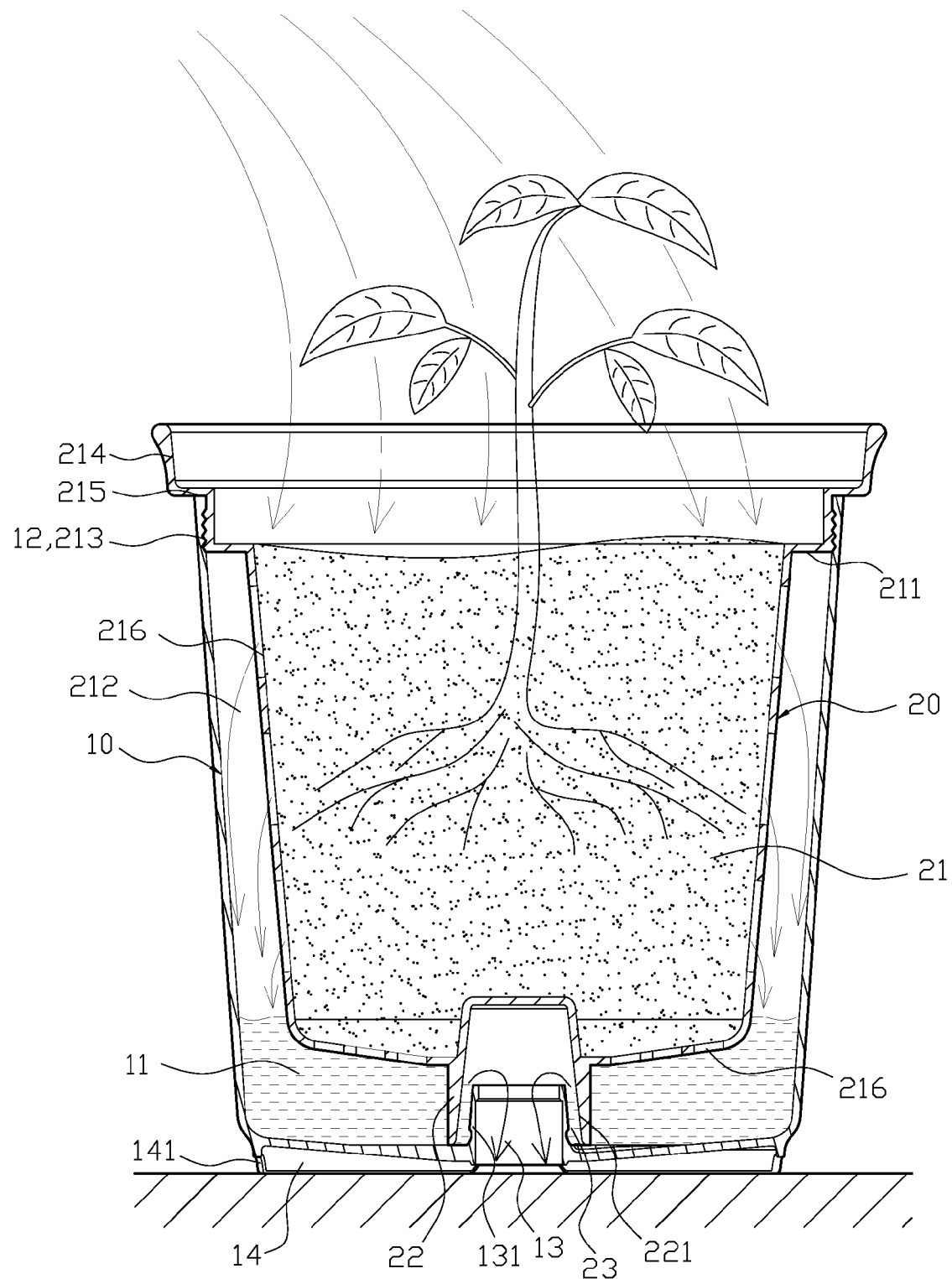
FIG. 4 illustrates a first schematic view of a practical use in the present invention.
Figure 5:
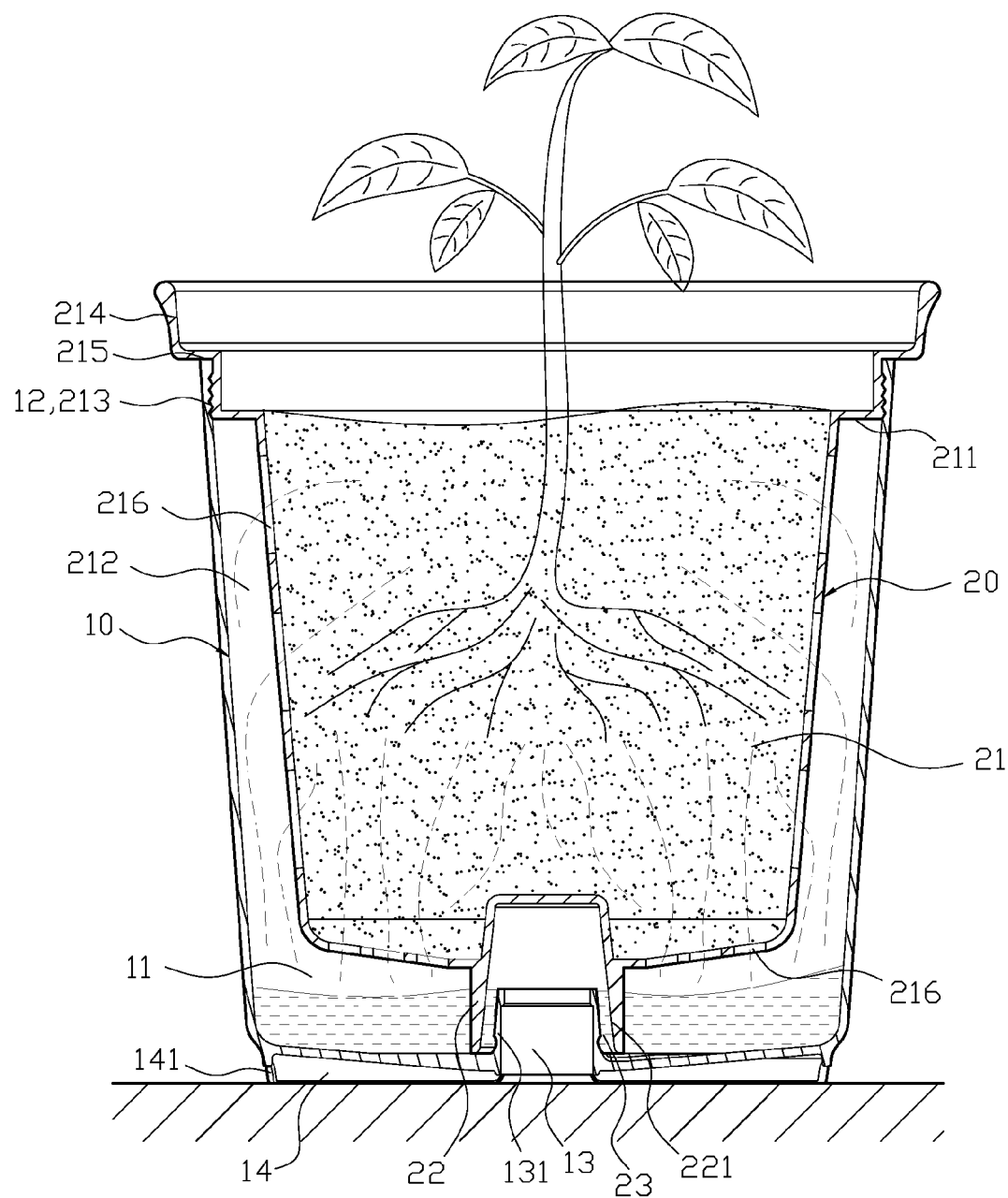
FIG. 5 illustrates a second schematic view of a practical use in the present invention.

Referring to FIG. 4 for practical use, the second receiving space (21) of the second pot body (20) has plantings therein, and when watering the plantings, the water content of the soil becomes saturated and the excessive water flows out from the through holes (216) of the second pot body (20). The water also flows to the receiving space (11) of the first pot body (10) and accumulates. When the accumulated water level is too high which may hinder the growth of the plantings, excessive water flows from the gap (23), the protruding unit (131) of the first pot body (10), and to the notches (141) to drain to achieve the goal of regulating water storage. Referring to FIG. 5, when there is sunlight or the room temperature is getting high, the accumulated water can be evaporated to reach the second receiving space (21) of the second pot body (20) through the through holes (216). When the water vapor encounters the soil with lower temperature, it condenses to become liquid to wet the soil and further provide necessary moisture to the plantings. Therefore, the accumulated water in the first pot body (10) can be evaporated and condensed in a cycle to automatically provide water to the plantings for a long period of time, so the soil can be wet for a long period of time to avoid the planting being withered due to lack of water. Furthermore, the cover (22) of the second pot body (20) is disposed surrounding the protruding unit (131), the first pot body (10) can be in a sealed situation when storing water. Thus, when the soil water in the second receiving space (21) of the second pot body (20) evaporates, a positive pressure is generated to bring the moisture in the receiving space (11) of the first pot body (10) to increase the efficiency of wetting the soil of the plantings. On the other hand, the opening of the second receiving space (21) has a spacing unit (211) to enable the second pot body (20) and the first pot body (10) to have the interlayer (212) therebetween, so that the water vapor can get into the second receiving space (21) of the second pot body (20) through the through holes (216) to increase the contact area of the soil and vapor to achieve the goal of wetting the soil.

Figure 8:
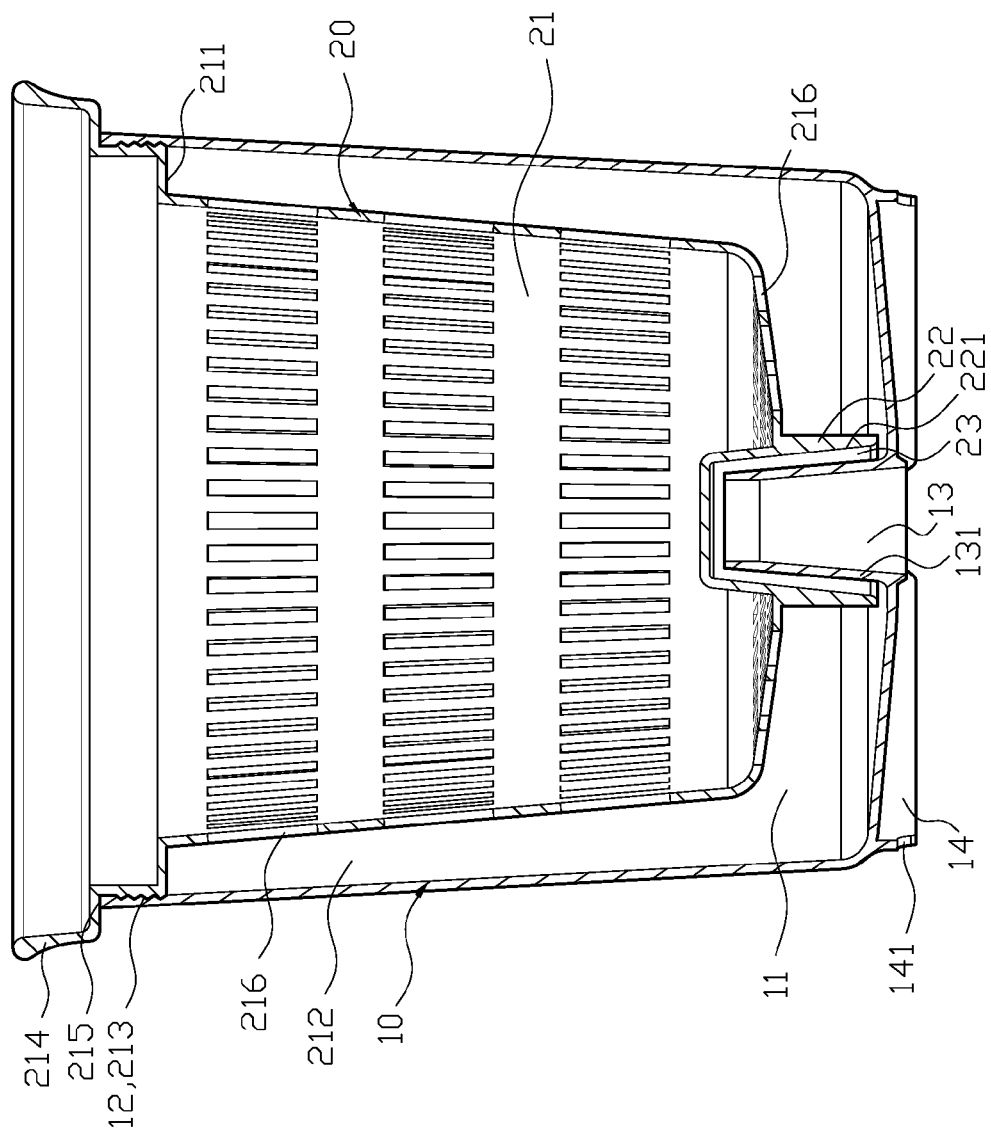
FIG. 8 illustrates a sectional view of the fourth embodiment in the present invention.

Referring to FIG. 8 for the fourth embodiment, the depth of the cap opening (221) is slightly over the second receiving space (21), and the height of the protruding unit (131) of the first pot body (10) is corresponding to the depth of the cap opening (221) to increase the water level of the first pot body (10), so that the roots of aquatic plants can be soaked in the water to further enhance the applicability of the pot structure.

Figure 9:
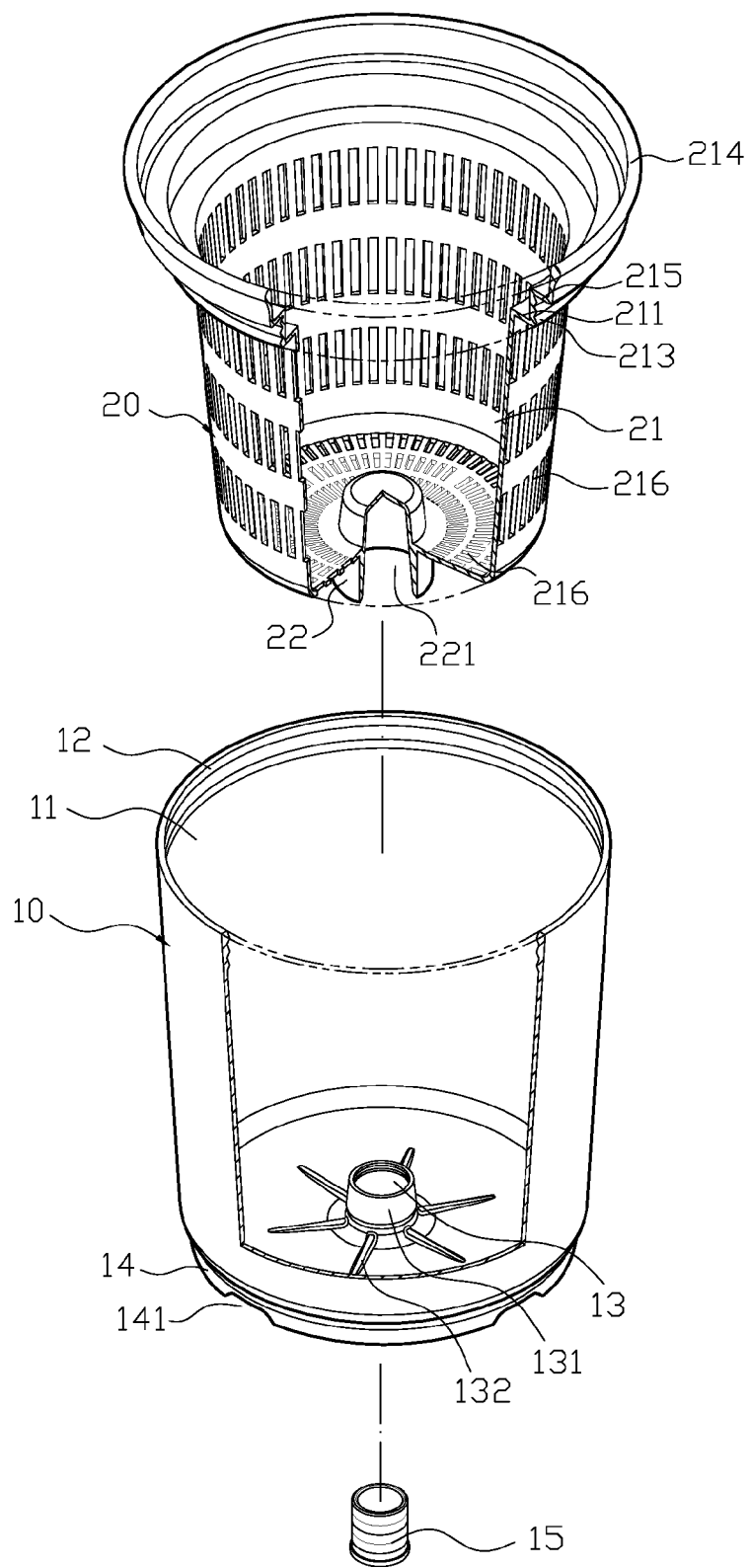
FIG. 9 illustrates an exploded view of the fifth embodiment in the present invention.
Figure 10:
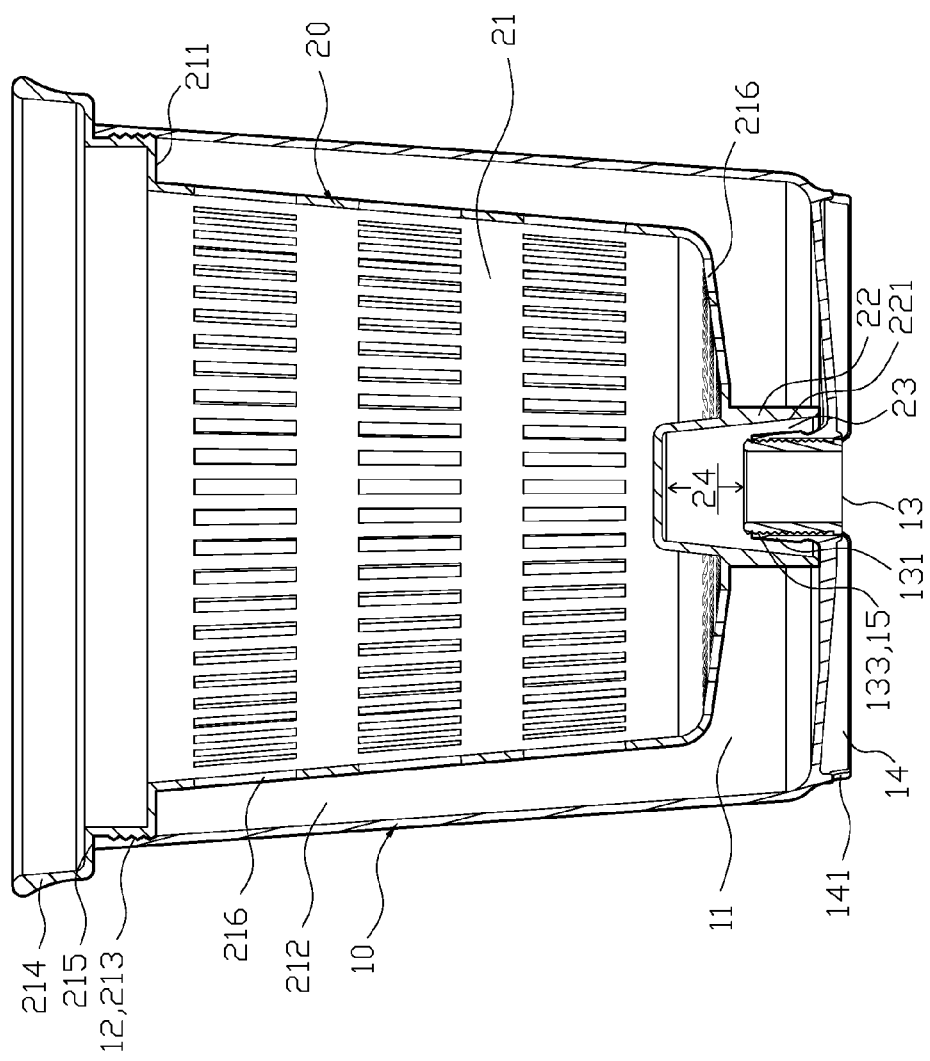
FIG. 10 illustrates a sectional view of the fifth embodiment in the present invention.

Referring to FIGS. 9 and 10 for the fifth embodiment, the inner periphery of the protruding unit (131) of the first pot body (10) has inner threads to connect with a retractable adjustable tube (15) with screws. The cap opening (221) of the second pot body (20) and the protruding unit (131) of the first pot body (10) are spaced to form a spacing (24), which can be adjusting by moving the adjustable tube (15) to change the water storage level and amount of the first pot body to further enhance the applicability of the pot structure.

Figure 11:
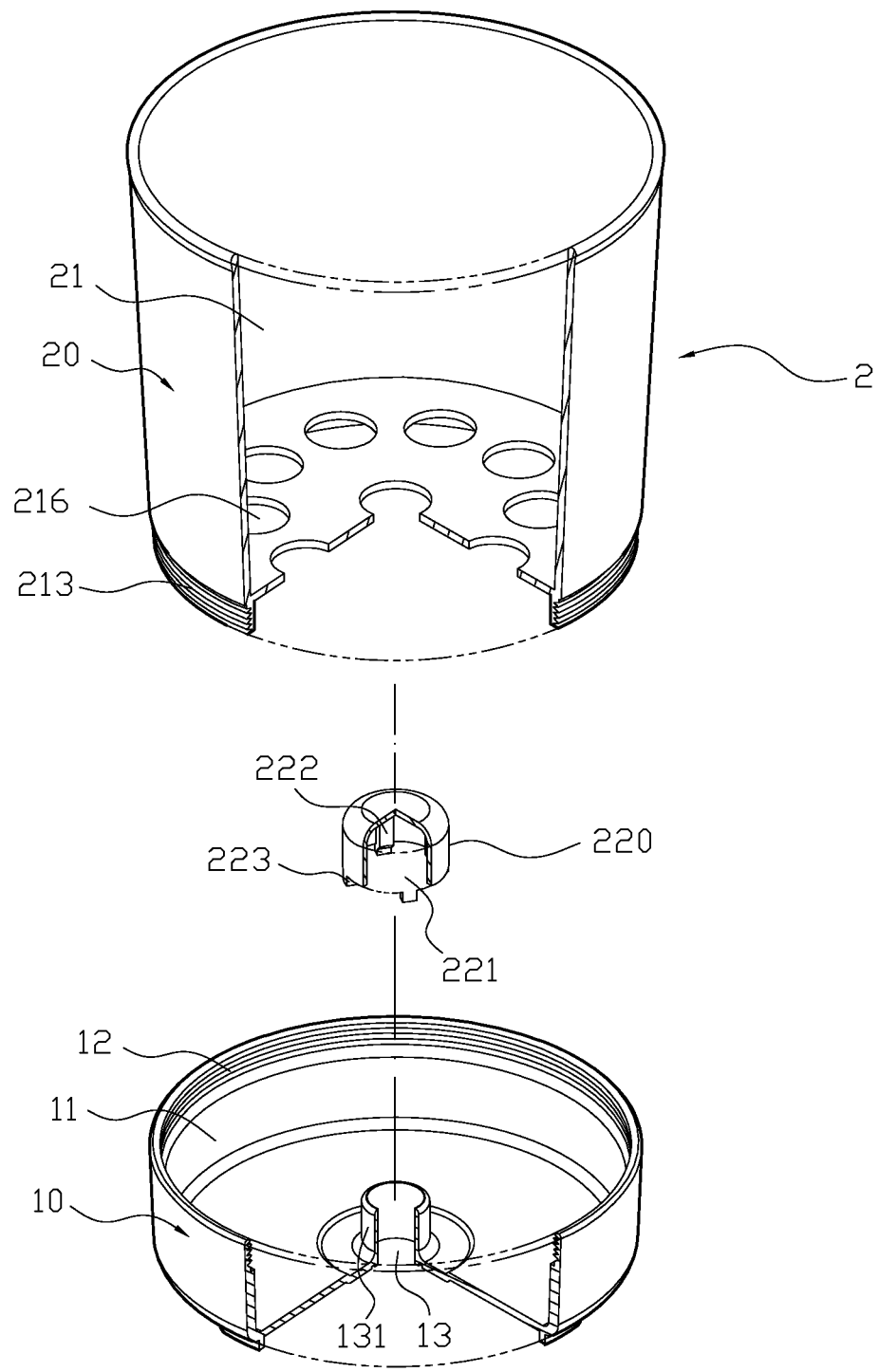
FIG. 11 illustrates an exploded view of the sixth embodiment in the present invention.
Figure 12:
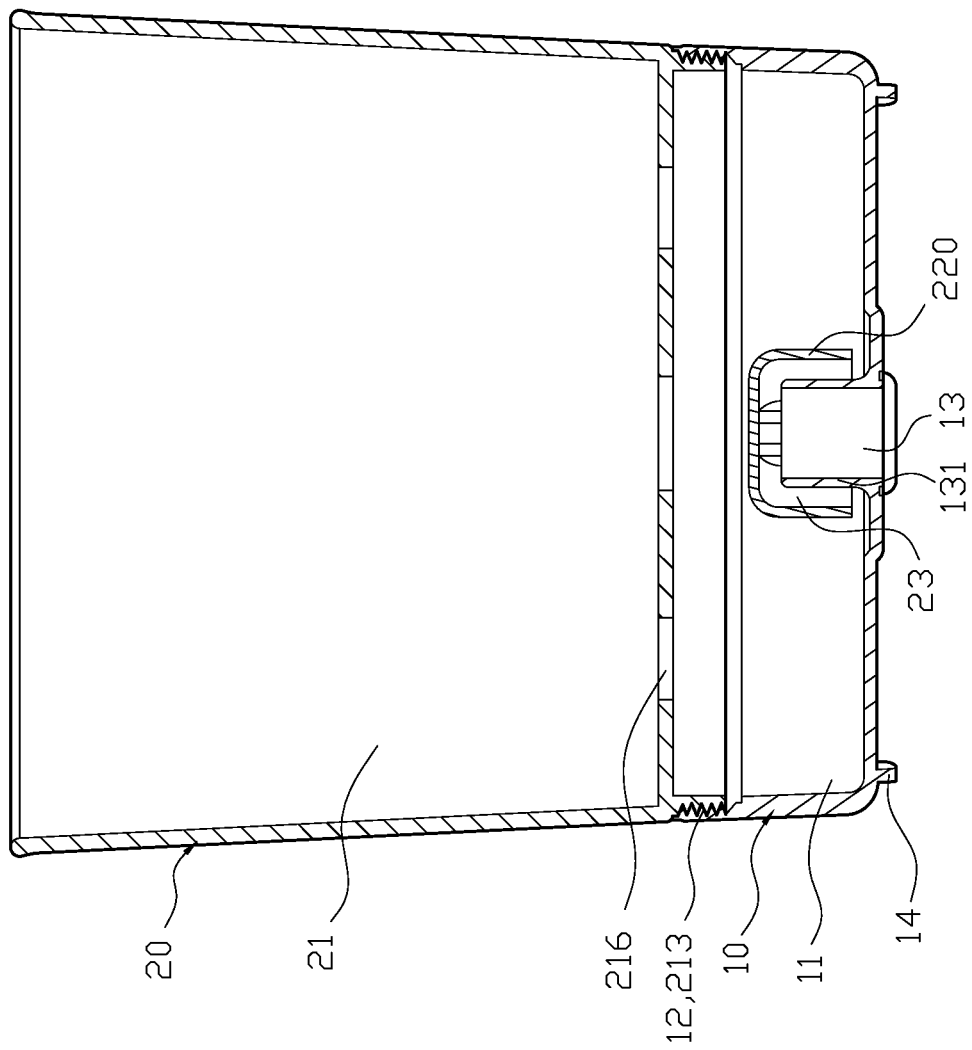
FIG. 12 illustrates a sectional view of the sixth embodiment in the present invention.

Referring to FIGS. 11 and 12 for the sixth embodiment, the second pot body (20) can be made a one piece (see FIGS. 1 to 10), or can be made individually including a main body (2) and a cap (220), wherein the cap (220) has a plurality of positioning ribs (222) inside to enable the cap opening (221) of the cap (220) to space with the protruding unit (131) of the first pot body (10). A plurality of supporting legs (223) extend from the opening of the cap (220), and the supporting legs (223) are disposed against the opening of the receiving space (11) of the first pot body (10), so that the receiving space (11) of the first pot body (10) is connected with the gap (23) of the cap (220).

Figure 14:
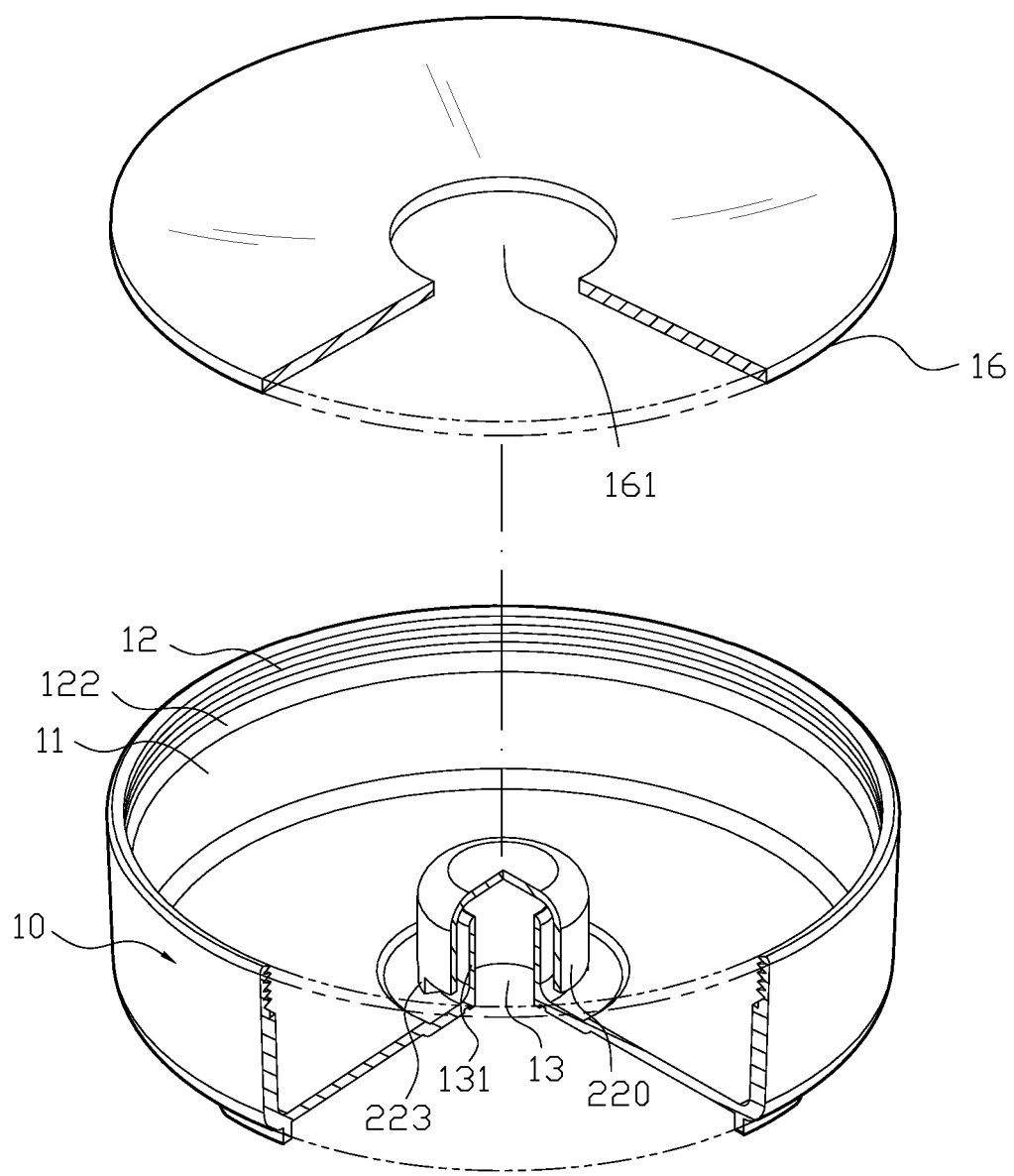
FIG. 14 illustrates an exploded view of the seventh embodiment in the present invention.
Figure 15:
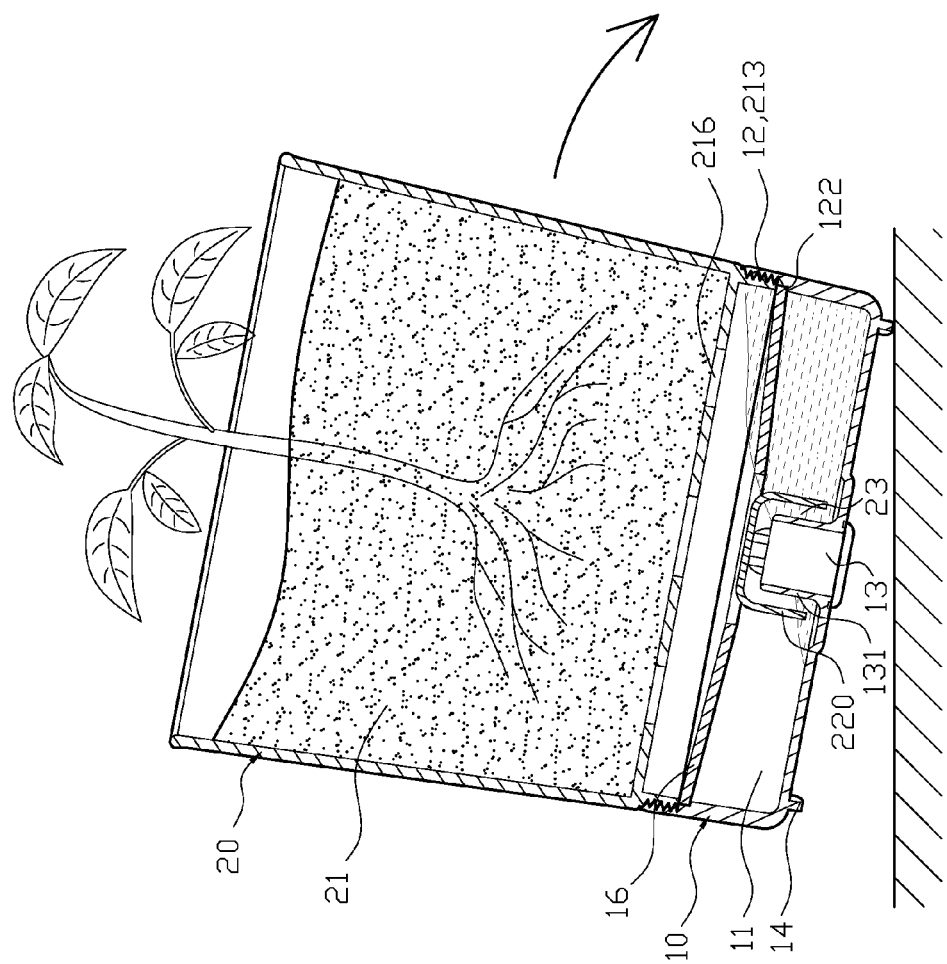
FIG. 15 illustrates a schematic view of practical use of the seventh embodiment in the present invention.

Referring to FIG. 14 for the seventh embodiment, a stopping edge (122) is formed near the connecting unit (12) of the first pot body (10), and the stopping edge (122) has a stopping board (16) which is expanding upwards, and a through opening (161) is formed in the middle portion thereof, so when the planting structure falls or tilts, the stopping board (16) can prevent the water in the first pot body (10) from getting into the soil of the second pot body (20) (See FIG. 15) to further enhance the applicability of the pot structure.

Figure 16:
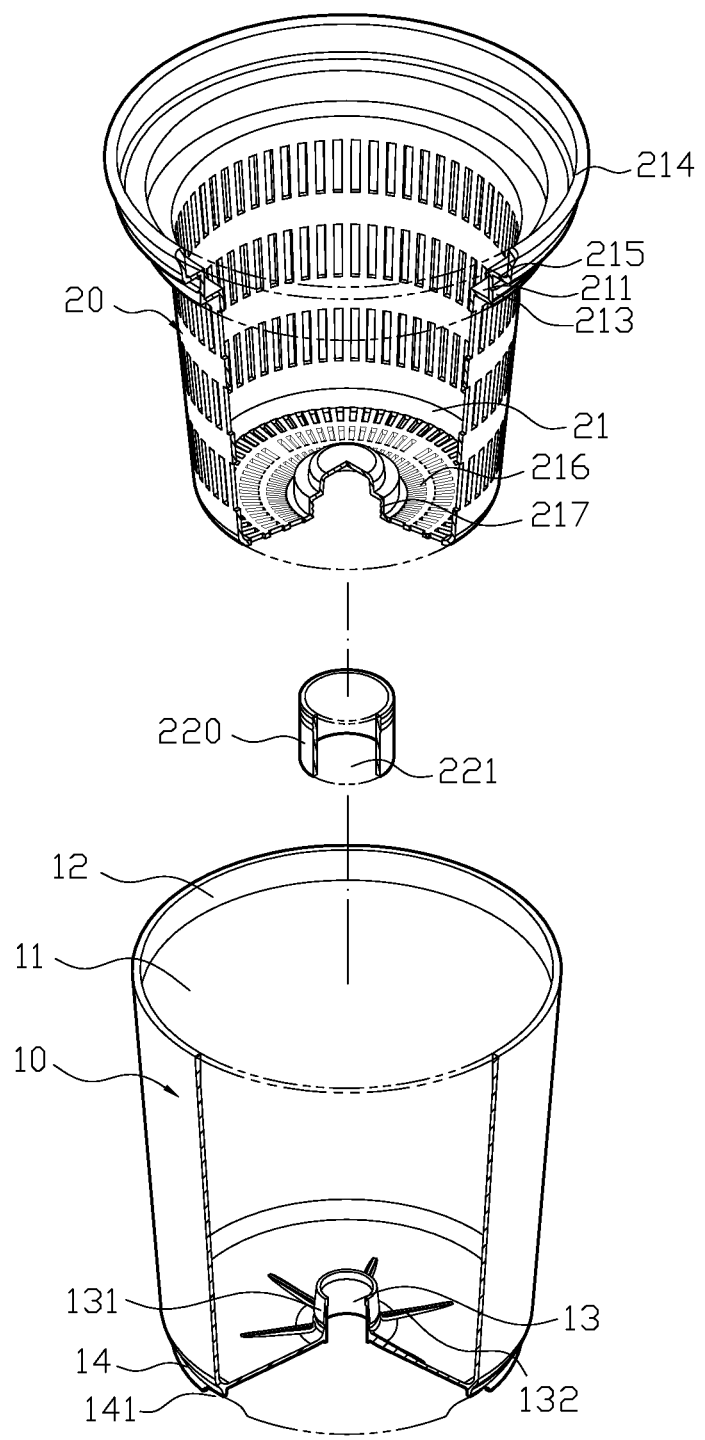
FIG. 16 illustrates an exploded view of the tenth embodiment in the present invention.
Figure 17:
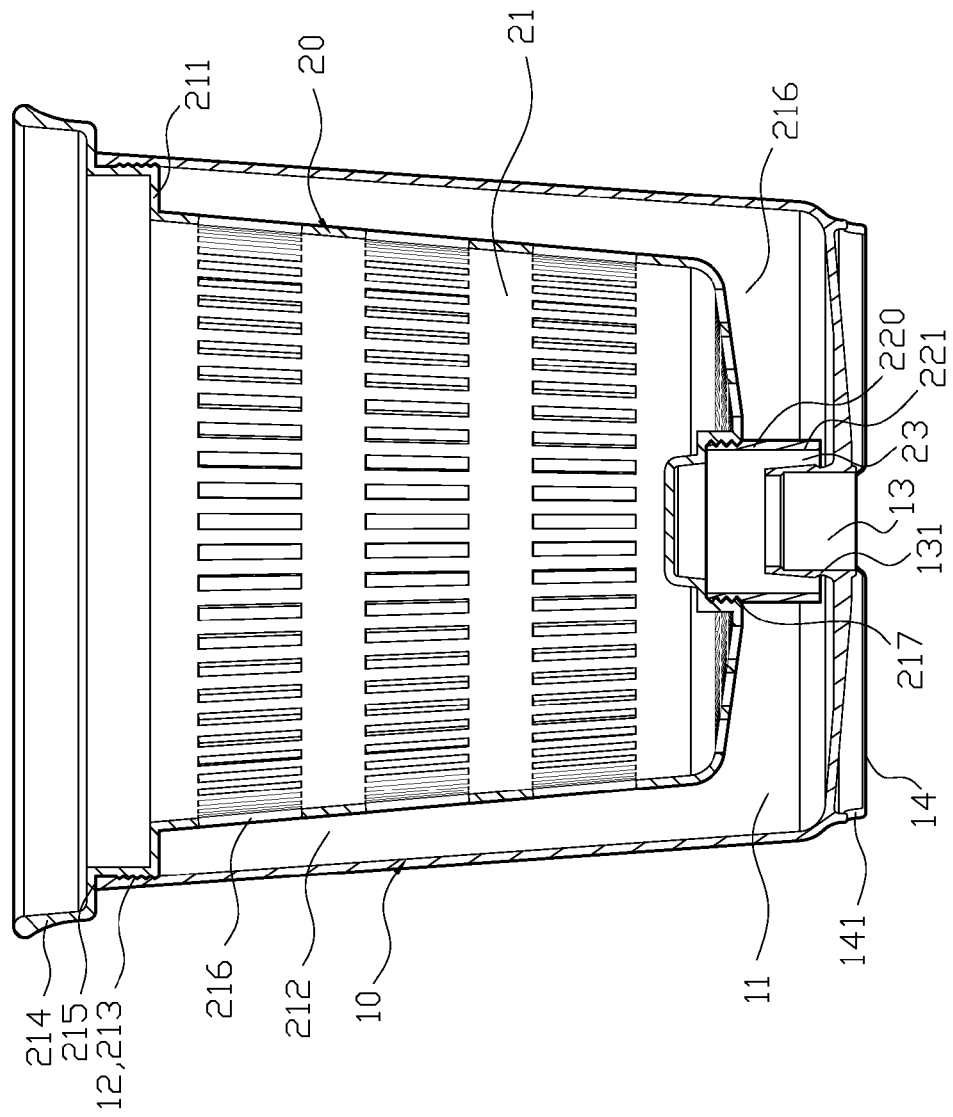
FIG. 17 illustrates a sectional view of the tenth embodiment in the present invention.

Referring to FIGS. 16 and 17 for the tenth embodiment, the second pot body (20) can be made as one piece (see FIGS. 1 to 10), or individually made including a main body (2) and a cap (220), and the main body (2) has a connecting hole (217) at the bottom thereof. The cap (220) is tubular and can be connected to the connecting hole (217) through the ways of locking or plugging, so that the cap (220) of the second pot body (20) can cover the periphery of the protruding unit (131) of the first pot body (10) and further seal the first pot body (10) when it stores water.

According to the embodiments stated above, the present invention is advantageous because when there is sunlight or the room temperature increases, the water stored in the receiving space (11) of the first pot body (10) evaporates to become water vapor that goes to the root portion of the plant, and further travels to the second receiving space (21) of the second pot body (20) through the through holes (216) thereof. When the water vapor encounters soil with lower temperature, it condenses to become liquid to wet the soil and automatically provides water to the plants, so that the water stored in the first pot body (10) can repeatedly evaporate and condense in a cycle to achieve the goal of automatically providing water to the plants. Furthermore, the soil of the plants can remain wet for a long period of time to prevent the plants from being withered due to lack of water.

Having described the invention by the description and illustrations above, it should be understood that these are exemplary of the invention and are not to be considered as limiting. Accordingly, the invention is not to be considered as limited by the foregoing description, but includes any equivalents.

What is claimed is:

1. An environment-friendly water-saving plant pot comprising:

a first pot body with a receiving space having an upward opening, and a water outlet hole formed in a bottom of the first pot body, and a protruding unit extending upwards from the periphery of the water outlet hole; and a second pot body disposed in the receiving space of the first pot body, having a sidewall and bottom forming a second receiving space with an upward opening, and a plurality of through holes formed along the sidewall to fluidly connect to the first pot body, and a cover portion extending downwards from the bottom of the second pot body and surrounding the protruding unit, the cover portion having a cover opening, the cover opening being vertically aligned with the protruding unit of the first pot body, and the cover opening and the protruding unit of the first pot body spaced to form a gap.

2. The environment-friendly water-saving plant pot of claim 1, wherein the opening of the second receiving space has a spacing unit, so that the second receiving space of the second pot body and the receiving space of the first pot body are spaced to form an interlayer.

3. The environment-friendly water-saving plant pot of claim 1, wherein the first pot body and second pot body are engaged by screws.

4. The environment-friendly water-saving plant pot of claim 1, wherein the first pot body and second pot body are engaged by stacking with each other.

5. The environment-friendly water-saving plant pot of claim 1, wherein the first pot body and second pot body are wedged to connect to each other.

6. The environment-friendly water-saving plant pot of claim 1, wherein a gasket is disposed between the first pot body and second pot body.

7. The environment-friendly water-saving plant pot of claim 1, wherein the through holes of the second pot body are formed at an opening surface of the second receiving surface or periphery thereof.

8. The environment-friendly water-saving plant pot of claim 1, wherein the protruding unit of the first pot body has inner threads inside to connect with an adjustable tube.

\* \* \* \* \*